United States Patent [19]
Matsui et al.

[11] Patent Number: 5,356,335
[45] Date of Patent: Oct. 18, 1994

[54] PRESSURE GRADIENT CONTROL SYSTEM
[75] Inventors: Yoshiaki Matsui, Nara; Mutsumi Moriwaki, Osaka, both of Japan
[73] Assignee: Taikisha, Ltd., Tokyo, Japan
[21] Appl. No.: 905,894
[22] Filed: Jun. 29, 1992
[30] Foreign Application Priority Data
  Jul. 5, 1991 [JP] Japan .................. 3-164760
[51] Int. Cl.$^5$ .............................. E05B 15/12
[52] U.S. Cl. ..................................... 454/52
[58] Field of Search ................. 454/50, 51, 52
[56] References Cited
U.S. PATENT DOCUMENTS

| | | | |
|---|---|---|---|
| 4,113,175 | 9/1978 | Sutton, Jr. ........... | 236/46 A |
| 4,729,294 | 3/1988 | Osawa et al. ........ | 454/52 |
| 4,729,295 | 3/1988 | Osawa et al. ........ | 454/52 |
| 4,730,553 | 3/1988 | Osawa et al. ........ | 454/52 |
| 4,840,116 | 6/1989 | Murakami et al. ... | 454/52 |
| 5,095,811 | 3/1992 | Shutic et al. ........ | 454/52 |

FOREIGN PATENT DOCUMENTS 3-27331 3/1991 Japan .
3-24264 4/1991 Japan .

Primary Examiner—Harold Joyce
Attorney, Agent, or Firm—Webb Ziesenheim Bruening Logsdon Orkin & Hanson

[57] ABSTRACT

A pressure gradient control system includes a ventilated area divided into a plurality of intercommunicating zones, a zone-to-zone pressure gradient detecting device for detecting pressure gradients between adjacent zones, a control unit for adjusting quantities of air supply or exhaust to/from the zones based on detection information received from the zone-to-zone pressure gradient detecting device to establish a predetermined pressure gradient between adjacent zones, and an interior-ambient pressure gradient detecting device for detecting pressure gradients between an ambient area and those of the zones communicating with the ambient area. The control unit is operable, in response to detection information received from the zone-to-zone pressure gradient detecting device and the interior-ambient pressure gradient detecting device, to adjust quantities of air supply or exhaust to/from the zones, thereby to establish the predetermined pressure gradient between adjacent zones and between the ambient area and those of the zones communicating with the ambient area.

7 Claims, 1 Drawing Sheet

PRESSURE GRADIENT CONTROL SYSTEM

BACKGROUND OF THE INVENTION

1. Field of the Invention

This invention relates to a pressure gradient control system. More particularly, the invention relates to a pressure gradient control system for use in ventilating a spraying booth divided into a plurality of intercommunicating spraying zones or clean room facilities having a plurality of intercommunicating cleaning zone. This control system is operable to adjust pressure gradients between adjacent zones. The system has a ventilated area divided into a plurality of intercommunicating zones, a zone-to-zone pressure gradient detecting device for detecting pressure gradients between adjacent zones, and a control unit for adjusting quantities of air supply or exhaust to/from the zones based on detection information received from the zone-to-zone pressure gradient detecting device to establish a predetermined pressure gradient between the adjacent zones.

2. Description of the Related Art

The above pressure gradient control system is operable automatically to adjust the pressure gradients between adjacent zones to a predetermined gradient by means of the control unit, thereby to regulate direction and volume of gas flows between the adjacent zones or to eliminate gas flows therebetween. Such automatic control dispenses with manual control of air supply or exhaust to/from the zones. However, no consideration has heretofore been made regarding pressure gradients between the ventilated area and ambient area (see Japanese Utility Model Application No. 1989-87018, for example).

The conventional system carries out adjustment of only relative quantities of air supply or exhaust among the zones, in which the quantities of air supply or exhaust to/from the respective zones are adjusted to a predetermined gradient based on detection of the pressure gradients between adjacent zones. This adjustment does not determine a total quantity of air supply to the ventilated area (i.e. a sum total of quantities of air supplied to the zones) or a total quantity of exhaust therefrom (i.e. a sum total of quantities of exhaust from the zones). In other words, although the predetermined pressure gradient is secured between adjacent zones in the ventilated area, the pressure gradients between the ventilated area and ambient area remain indefinite. Consequently, the conventional system has the disadvantages of undesirable gas flows occurring between the ambient and those of the zones communicating with the ambient, and of producing gas flows counter to a desired direction of gas flows.

SUMMARY OF THE INVENTION

The object of the present invention is to provide an improved pressure gradient control system to overcome the above disadvantages.

This object is fulfilled, according to the present invention, by a pressure gradient control system comprising a ventilated area divided into a plurality of intercommunicating zones, a zone-to-zone pressure gradient detecting device for detecting pressure gradients between adjacent pairs of the zones, a control unit for adjusting quantities of air supply or exhaust to/from the zones based on detection information received from the zone-to-zone pressure gradient detecting device to establish a predetermined pressure gradient between adjacent pairs of the zones, and an interior-ambient pressure gradient detecting device for detecting pressure gradients between an ambient area and those of the zones communicating with the ambient area, wherein the control unit is operable, in response to detection information received from the zone-to-zone pressure gradient detecting device and the interior-ambient pressure gradient detecting device, to adjust quantities of air supply or exhaust to/from the zones, thereby to establish the predetermined pressure gradient between adjacent pairs of the zones and between the ambient area and those of the zones communicating with the ambient area.

In the above construction, the control of the quantities of air supply or exhaust to/from the zones is not simply based on the relative concept of adjusting the pressure gradients between adjacent zones to a predetermined gradient. This control is effected with the condition that the pressure gradients between the ambient area and those of the zones communicating with the ambient area are also adjusted to the predetermined gradient. Consequently, the predetermined gradient is secured between adjacent zones while the pressure gradients between the ambient area and those of the zones communicating with the ambient area are also adjusted to the predetermined gradient. This is achieved with a particular relationship established between the total quantity of air supply and the total quantity of exhaust to/from the ventilated area.

With the conventional system, as noted above, although the predetermined pressure gradient is secured between adjacent zones in the ventilated area, the pressure gradients between the ventilated area and ambient area remain indefinite. Consequently, the conventional system has the disadvantages of undesirable gas flows occurring between the ambient and those of the zones communicating with the ambient, and of producing gas flows counter to a desired direction of flows. The present invention effectively overcomes such disadvantages. Moreover, the control system according to the present invention is capable of stably and automatically maintaining a desired gas flow condition not only between adjacent zones in the ventilated area but between the ambient area and those of the zones communicating with the ambient area.

The above control unit may be operable to derive deviations in gas displacement of the respective zones and a deviation in gas displacement of the ventilated area as a whole from the detection information received from the zone-to-zone pressure gradient detecting device and the interior-ambient pressure gradient detecting device. In this case, when the deviation of the ventilated area as a whole shows too small a quantity of exhaust, the control unit decreases the quantity of air supply or increases the quantity of exhaust to/from the zone having a minimum deviation until the minimum deviation moves a predetermined amount toward zero. When the deviation of the ventilated area as a whole shows too large a quantity of exhaust, the control unit increases the quantity of air supply or decreases the quantity of exhaust to/from the zone having a maximum deviation until the maximum deviation moves the predetermined amount toward zero. The control unit repeats calculations of the deviations in gas displacement, and output adjustment of displacement based on results of the calculations, thereby to equalize air pressures in the respective zones and the ambient area.

With the control unit operable as above, the pressure gradient control system according to the present invention produces no gas flows between adjacent zones in the ventilated area and no gas flows between the ambient area and those of the zones communicating with the ambient area.

The pressure gradient control system according to the present invention may further comprise an object detecting device for detecting an object passing through communicating openings between adjacent pairs of the zones. In this case, the control unit is operable, in response to detection information received from the object detecting device, to invalidate the detection information received from the zone-to-zone pressure gradient detecting device during passage of the object through the communicating openings.

When an object under treatment is passing through one of the communicating openings between adjacent zones, the presence of the object varies a resistance to gas flows through that opening. This results in a pressure gradient between the zones different from when there is no object passing through the opening.

Cases are conceivable where the presence of a passing object in any of the openings is a temporary, transient condition, and the absence of a passing object therefrom is a normal condition. In such cases, the zone-to-zone pressure gradient detecting device will output disturbed detection information during passage of the object in the course of gradient adjustment control intended to adjust the pressure gradients between adjacent zones to a predetermined gradient in the normal condition. The disturbed information due to the passing object may render the intended pressure gradient control somewhat unstable.

However, the control system employing the object detecting device as above allows the control unit to carry out the pressure gradient control by invalidating the detection information provided by the zone-to-zone pressure gradient detecting device during passage of an object through any of the communicating openings. In this way, the above inconvenience is avoided in adjusting the pressure gradients between adjacent zones in the normal condition with no object passing through any of the communicating openings. Thus, the pressure gradient adjustment control is effected to produce desired results in a very reliable manner.

Other features and advantages of the present invention will be apparent from the following description.

DETAILED DESCRIPTION OF THE PREFERRED EMBODIMENT

Figure 1:
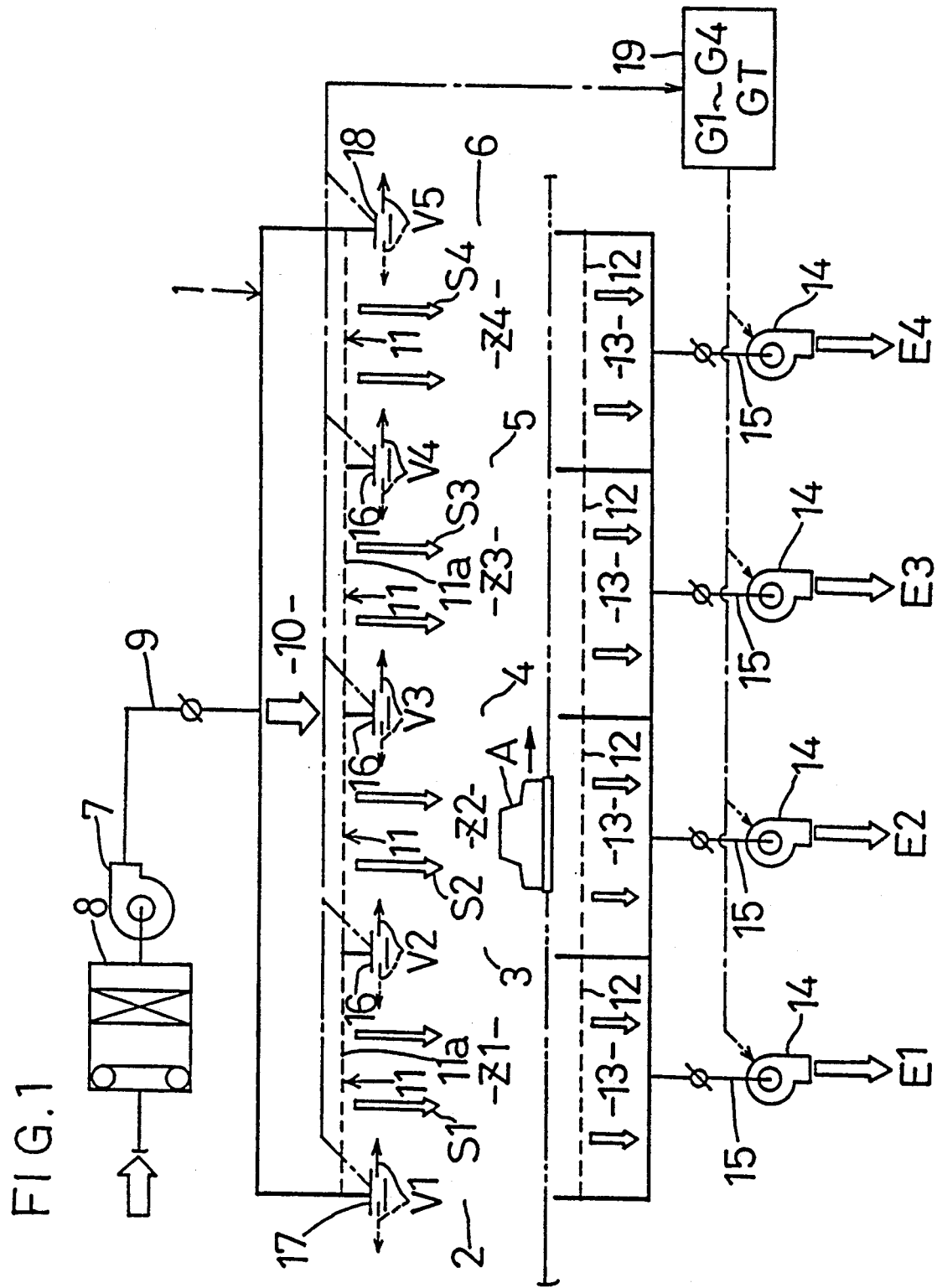
FIG. 1 is a system diagram of a spraying booth embodying the present invention.

A pressure gradient control system according to the present invention will be described in detail with reference to the drawing.

FIG. 1 schematically shows a ventilating system for a spraying booth 1. The booth 1 in tunnel form is divided into a plurality of zones Z1, Z2, Z3 and Z4 in a transport direction of an object A under treatment. The object A enters an inlet opening 2 at one end of the booth 1, and proceeds through communicating openings 3, 4 and 5 between adjacent zones toward an outlet opening 6 at the other end of the booth 1. In the course of this movement, the object A undergoes predetermined spraying treatments successively in the respective zones Z1, Z2, Z3 and Z4.

Each of the zones Z1, Z2, Z3 and Z4 has an air supply opening 11 in the ceiling for downwardly supplying air transmitted by a supply fan 7 from an air-conditioner 8 through a supply duct 9 to a supply chamber 10. Each air supply opening 11 has a filter 11a extending across it.

Each of the zones Z1, Z2, Z3 and Z4 has a grated floor 12 for downwardly exhausting interior gas. An exhaust chamber 13 is formed under the grated floor 12 of each zone. Each exhaust chamber 13 has a separate exhaust duct 15 connected thereto and having an exhaust fan 14.

Flow velocity sensors 16 are disposed between adjacent zones to act as zone-to-zone pressure gradient detecting means for detecting velocities V2, V3 and V4 and directions of horizontal gas flows between the adjacent zones. Further, the first zone Z1 communicating with the ambient through the inlet opening 2 and the fourth zone Z4 communicating with the ambient through the outlet opening 6 have flow velocity sensors 17 and 18 disposed at the openings 2 and 6, respectively, to act as interior-ambient pressure gradient detecting means for detecting velocities V1 and V5 and directions of horizontal gas flows between the booth 1 and the ambient.

Reference numeral 19 denotes a control unit for adjusting gas displacements of the respective zones Z1, Z2, Z3 and Z4 by inverter control through the exhaust fans 14 based on detection information received from the velocity sensors 16, 17 and 18, to establish a predetermined pressure gradient between the adjacent zones in the booth 1 and between the first and fourth zones Z1 and Z4 and the ambient. In this embodiment, the control by the control unit 19 is intended to equalize gas pressure in the zones Z1, Z2, Z3 and Z4 and the ambient to eliminate horizontal gas flows between the adjacent zones in the booth 1, and horizontal air flows between the first and fourth zones Z1 and Z4 and the ambient (i.e. air or gas flows into and out of the booth 1).

By eliminating horizontal gas flows between the adjacent zones in the booth 1 and between the first and fourth zones Z1 and Z4 and the ambient, the invention avoids movement of dust and overspray paint mist between the adjacent zones, entry of ambient dust to the booth 1, and escape of the overspray paint mist to the ambient.

In a specific mode of control by the control unit 19, gas flows detected by the velocity sensors 16, 17 and 18 to follow the transport direction of the object A are regarded as gas flows of positive velocity V. On this concept, the equation set out below are used to derive deviations G1, G2, G3 and G4 in gas displacement of the respective zones Z1, Z2, Z3 and Z4 (i.e. values indicating quantities of exhaust E1, E2, E3 and E4, too large or too small, in relation to quantities of air supply S1, S2, S3 and S4), and a deviation GT in gas displacement of the booth 1 as a whole (i.e. a value indicating a sum total of quantities of exhaust E1, E2, E3 and E4, too large or too small, in relation to a sum total of quantities of air supply S1, S2, S3 and S4 for the respective zones).

$$G1 = K1 \times V1 - K2 \times V2$$

$$G2 = K2 \times V2 - K3 \times V3$$

$$G3 = K3 \times V3 - K4 \times V4$$

$$G4 = K4 \times V4 - K5 \times V5$$

$$GT = K1 \times V1 - K5 \times V5$$

where K1, K2, K3, K4 and K5 are fixed coefficients determined from areas and the like of the inlet opening 2, outlet opening 6, and the openings 3, 4 and 5, respectively.

A zone Z whose deviation G is negative has too small a quantity of exhaust. A zone Z whose deviation G is positive has too large a quantity of exhaust. The greater the absolute value of the deviation is, the greater is the extent of being too small or too large.

When the deviation GT of the booth 1 is negative, the booth 1 as whole is in a state of having too small a quantity of exhaust. When the deviation GT is positive, the booth 1 as a whole is in a state of having too large a quantity of exhaust. Here again, the greater the absolute value is, the greater is the extent of being too small or too large.

When the deviation GT of the entire booth 1 is found negative as a result of the above calculations, output of the exhaust fan 14 of the zone having the smallest of the deviations G1-G4 is increased until this smallest deviation moves a predetermined amount DG toward zero. Conversely, when the deviation GT of the entire booth 1 is positive, output of the exhaust fan 14 of the zone having the greatest of the deviations G1-G4 is decreased until this greatest deviation moves the predetermined amount DG toward zero. Subsequently, the control unit 19 repeats the calculations of the deviations in gas displacement, and output adjustment of the exhaust fans 14 based on results of the calculations. As a result, the air pressures in the respective zones Z1, Z2, Z3 and Z4 and ambient pressure are equalized and maintained equal.

Various control modes may be employed by selecting different values as the predetermined amount DG. For example, the amount DG may correspond to the absolute value of an initial maximum or minimum zone deviation Gmax or Gmin, or to a half of the absolute value thereof. Alternatively, the amount DG may be determined as a fixed value without regard to the initial maximum or minimum zone deviation Gmax or Gmin.

The present invention is not limited in application to pressure gradient control of treatment zones in a spraying booth, but is applicable also to pressure gradient control of a plurality of cleaning zones in clean room facilities, for example.

The flow velocity sensors 16, 17 and 18 may be replaced with other devices for detecting pressure gradients between adjacent zones and between zones Z1 and Z4 and the ambient. For example, pressure gradients between adjacent zones and between zones Z1 and Z4 and the ambient may be determined from detection information provided by displacement sensors for detecting the quantities of air supply S1, S2, S3 and S4 to the respective zones and the quantities of exhaust E1, E2, E3 and E4 therefrom.

An object detector may be disposed at each of the communicating openings 3, 4 and 5 between the adjacent zones for detecting the object A passing therethrough. Then, the detection information received from the zone-to-zone gradient detecting device during passage of the object A is regarded as invalid for the purpose of pressure gradient control.

In the foregoing embodiment, the pressure gradients between the adjacent zones and between the end zones and the ambient are adjusted by controlling the quantities of exhaust from the respective zones Z1, Z2, Z3 and Z4. Instead, the pressure gradients may be adjusted by controlling the quantities of air supply to the respective zones or by controlling the quantities of both air supply and gas exhaust.

For controlling the quantities of supply or exhaust to/from the respective zones, outputs of supply fans or exhaust fans associated with the respective zones may be adjusted, or supply control dampers or exhaust control dampers associated with the respective zones may be adjusted.

Various modifications are possible in relation to specific displacement adjusting sequences for adjusting the quantities of air supply or exhaust to/from the respective zones based on the detection information received from the zone-to-zone gradient detecting device and interior-ambient gradient detecting device, to establish the predetermined pressure gradient between the adjacent zones and between the end zones and the ambient.

What is claimed is:

1. A pressure gradient control system comprising:
   a ventilated area divided into a plurality of intercommunicating zones;
   zone-to-zone pressure gradient detecting means for detecting pressure gradients between adjacent pairs of said zones;
   control means for adjusting quantities of air supply or exhaust to/from said zones based on detection information received from said zone-to-zone pressure gradient detecting means to establish a predetermined pressure gradient between adjacent pairs of said zones; and
   interior-ambient pressure gradient detecting means for detecting pressure gradients between an ambient area and those of said zones communicating with the ambient area;
   wherein said control means is operable, in response to detection information received from said zone-to-zone pressure gradient detecting means and said interior-ambient pressure gradient detecting means, to adjust quantities of air supply or exhaust to/from said zones, thereby to establish the predetermined pressure gradient between adjacent pairs of said zones and between the ambient area and those of said zones communicating with the ambient area.

2. A pressure gradient control system comprising:
   a ventilated area divided into a plurality of intercommunicating zones;
   zone-to-zone pressure gradient detecting means for detecting pressure gradients between adjacent pairs of said zones;
   control means for adjusting quantities of air supply or exhaust to/from said zones based on detection information received from said zone-to-zone pressure gradient detecting means to establish a predetermined pressure gradient between adjacent pairs of said zones;
   interior-ambient pressure gradient detecting means for detecting pressure gradients between an ambient area and those of said zones communicating with the ambient area; and
   object detecting means for detecting an object passing through communicating openings between adjacent pairs of said zones;
   wherein said control means is operable, in response to detection information received from said zone-to-zone pressure gradient detecting means and said interior-ambient pressure gradient detecting means, to adjust quantities of air supply or exhaust to/from said zones, thereby to establish the predetermined pressure gradient between adjacent pairs of said zones between the ambient area and those of said zones communicating with the ambient area;

said control means being further operable, in response to detection information received from said object detecting means, to invalidate said detection information received from said zone-to-zone pressure gradient detecting means during passage of said object through said communicating openings.

3. A pressure gradient control system comprising:

a ventilated area divided into a plurality of intercommunicating zones;

zone-to-zone pressure gradient detecting means for detecting pressure gradients between adjacent pairs of said zones;

control means for adjusting quantities of air supply or exhaust to/from said zones based on detection information received from said zone-to-zone pressure gradient detecting means to establish a predetermined pressure gradient between adjacent pairs of said zones; and interior-ambient pressure gradient detecting means for detecting pressure gradients between an ambient area and those of said zones communicating with the ambient area;

wherein said control means is operable to derive deviations in gas displacement of the respective zones and a deviation in gas displacement of said ventilated area as a whole from the detection information received from said zone-to-zone pressure gradient detecting means;

when the deviation of said ventilated area as a whole is too small a quantity of exhaust, said control means is operable to decrease the quantity of air supply or increase the quantity of exhaust to/from the zone having a minimum deviation until said minimum deviation moves a predetermined amount toward zero;

when the deviation of said ventilated area as a whole shows too large a quantity of exhaust, said control means is operable to increase the quantity of air supply or decrease the quantity of exhaust to/from the zone having a maximum deviation until said maximum deviation moves the predetermined amount toward zero; and as calculations of said deviations in gas displacement and output adjustment of displacement based on results of the calculations are repeated, air pressure in the respective zones and the ambient area are equalized.

4. A pressure gradient control system as claimed in claim 3, further comprising object detecting means for detecting an object passing through communicating openings between adjacent pairs of said zones, wherein said control means is operable, in response to detection information received from said object detecting means, to invalidate the detection information received from said zone-to-zone pressure gradient detecting means during passage of said object through said communicating openings.

5. A pressure gradient control system as claimed in claim 4, wherein said ventilated area is a spraying booth.

6. A pressure gradient control system as claimed in claim 4, wherein said zone-to-zone pressure gradient detecting means includes zone-to-zone flow velocity sensors for detecting velocities and directions of horizontal gas flows between adjacent pairs of said zones.

7. A pressure gradient control system as claimed in claim 4, wherein said interior-ambient pressure gradient detecting means includes interior-ambient flow velocity sensors for detecting velocities and directions of horizontal gas flows between said ventilated area and said ambient area.

* * * * *